(12) United States Patent
Deutsch et al.

(10) Patent No.: US 6,421,996 B1
(45) Date of Patent: Jul. 23, 2002

(54) HARVESTER WITH BALE FORMING CHAMBER HAVING A TRANSPORT MODE

(75) Inventors: Timothy Arthur Deutsch, Newton; Michael Lee Pearson; Virgil Dean Haverdink, both of Ankeny, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/615,190

(22) Filed: Jul. 12, 2000

(51) Int. Cl.⁷ .................... A01D 39/00; A01D 43/02; A01D 75/00
(52) U.S. Cl. ............................ 56/341; 100/88
(58) Field of Search ............. 56/341, 343–364, 56/DIG. 1; 100/88, 89; 414/246, 781

(56) References Cited

U.S. PATENT DOCUMENTS

| | | | | |
|---|---|---|---|---|
| 3,622,016 A | * | 11/1971 | Welker | 414/789.3 |
| 3,974,632 A | * | 8/1976 | Van Der Lely | 56/341 |
| 4,534,285 A | | 8/1985 | Underhill | 100/88 |
| 4,553,378 A | | 11/1985 | Fachini et al. | 56/16.6 |
| 4,559,770 A | * | 12/1985 | Mast | 56/341 |
| 4,566,380 A | * | 1/1986 | Clostermeyer et al. | 100/89 |
| 4,770,093 A | * | 9/1988 | Gunther et al. | 100/88 |
| 4,798,044 A | * | 1/1989 | Viaud et al. | 56/341 |
| 4,815,266 A | * | 3/1989 | Ratzlaff et al. | 56/341 |
| 4,821,637 A | * | 4/1989 | Viaud | 100/88 |
| 5,822,967 A | * | 10/1998 | Hood et al. | 56/341 |
| 6,032,446 A | | 3/2000 | Gola et al. | 56/341 |

* cited by examiner

Primary Examiner—Robert E. Pezzuto
Assistant Examiner—Árpád Fábián Kovács

(57) ABSTRACT

A harvester includes an integral two-section baling device with the section movement designed to provide both a bale discharge function and a transport height reduction function. In one embodiment, one section of the device includes rollers which follow a downwardly sloped ramp as the sections are opened relative to each other. The sloped ramped additionally serves as a portion of a finished bale handler and bale support. In a second embodiment, an additional hydraulic cylinder system controls the downward movement of the opened sections towards the transport position. Existing baler functions are advantageously utilized to provide transport height reduction with a minimal amount of additional hardware, and the operator can switch between transport and operational modes quickly and easily.

29 Claims, 4 Drawing Sheets

HARVESTER WITH BALE FORMING CHAMBER HAVING A TRANSPORT MODE

BACKGROUND OF THE INVENTION

1) Field of the Invention

The present invention relates generally to agricultural equipment such as cotton harvesters, and, more specifically, to harvesters with material handling and compacting structure.

2) Related Art

Harvesters such as cotton pickers and cotton strippers in the past have included a large basket for receiving cotton material removed from plants. Efficiently compressing the cotton material and maintaining the material in a compacted state in the basket and transferring of the material in the basket into a boll buggy or cotton compactor quickly and without spillage have been constant sources of problems. Providing adequate storage space on the harvester while maintaining shipping and transport height within legal restrictions has also been difficult.

A harvester with integral compacting and bale forming structure is shown in U.S. Pat. No. 6,032,446. Such structure provides efficient compacting and storage on the harvester and improves cotton handling. The bale forming structure, however, has rigid side walls separated by a plurality of rollers having continuous belts defining a baling chamber, and tends to be quite large. The bale forming structure cannot be telescoped easily into a reduced height transport configuration. Therefore, maintaining the transport and shipping height within the maximum height restrictions without decreasing harvester storage capacity or bale handling functions has presented problems.

BRIEF SUMMARY OF THE INVENTION

It is therefore an object of the present invention to provide an improved cotton harvester with a module builder and module handling system.

It is another object to provide a transport system for a cotton harvester with a bale forming structure. It is a further object to provide such a system which overcomes most or all of the aforementioned problems.

It is a further object of the present invention to provide an improved transport system for the bale forming structure of a harvester wherein the height of the harvester can be minimized for transport while a large bale capacity can be maintained for increased productivity during harvest. It is another object to provide such a system which can be moved quickly between harvest and transport positions.

It is still another object of the present invention to provide an improved height reducing system for a harvester with an integral baling or compacting device wherein telescoping of the device is not possible or practical.

It is yet another object of the invention to provide an improved transport system for a bale forming structure mounted on a cotton harvester, wherein the bale discharge system is advantageously utilized to lower the height of the structure for transport. It is still another object to provide such a transport system wherein the bale forming structure includes sections that are moveable relative to each other to discharge a bale, and the movement of the sections can be controlled to provide a raised harvest position or a lowered transport position. It is yet another object to provide such a structure wherein the sections are connected by an upper pivot and are selectively moved, either by guiding one of the sections on a ramp which is part of a bale handler and bale support or controlling one of the sections by a cylinder, to lower the pivot for transport.

A cotton harvester includes a frame supporting rear-mounted compacting and baling structure receiving harvested cotton and providing a compact bale as front-mounted harvesting units move forwardly over a field of cotton. In the embodiment shown, the baling structure includes a clamshell type of housing having front and rear sections pivotally connected at an upper location and supporting belts for forming a large round compact bale of cotton. When a full-sized bale is completed, discharge cylinders pivot the rear section of the housing rearwardly and upwardly while the forward section remains generally stationary, and the formed bale is discharged rearwardly and downwardly into a cradle arrangement at the rear of the frame for intermediate storage and transport so harvesting can continue.

To move the baling structure from a raised harvesting position to a lowered position for reduced transport height, the upper portion of the forward section is rocked downwardly and rearwardly while the sections are opened relative to each other to lower the pivot. In one embodiment, the rear section is guided down the bale discharge structure after the forward section is released for pivoting about a lowermost pivotal connection with the frame as the discharge cylinders pivot the sections about the upper location. In a second embodiment, separate cylinders connected between the frame and the front section positively rock the front section rearwardly and downwardly, and the discharge cylinders are activated to open the sections.

The transport height of the harvester baler can be reduced substantially without affecting bale capacity. The configuration of the bale forming chamber is advantageously utilized for the height reducing function so that the complexity and manufacturing costs of the system are minimized. Changing from field-working to transport is an easy and quick procedure. Productivity of the harvester is increased since the unit can quickly release a bale or module without stopping. An accumulator upstream of the forming chamber facilitates continuous harvester operation while the baling structure is unloading a finished bale. The accumulator telescopes to reduce transport height. The rear bale carrier allows the bale to be placed at a convenient location in the field rather than at random locations dependent on row length and cotton yield.

These and other objects, features and advantages of the present invention will become apparent to one skilled in the art upon reading the following detailed description in view of the drawings.

DETAILED DESCRIPTION OF THE DRAWINGS

Figure 1:
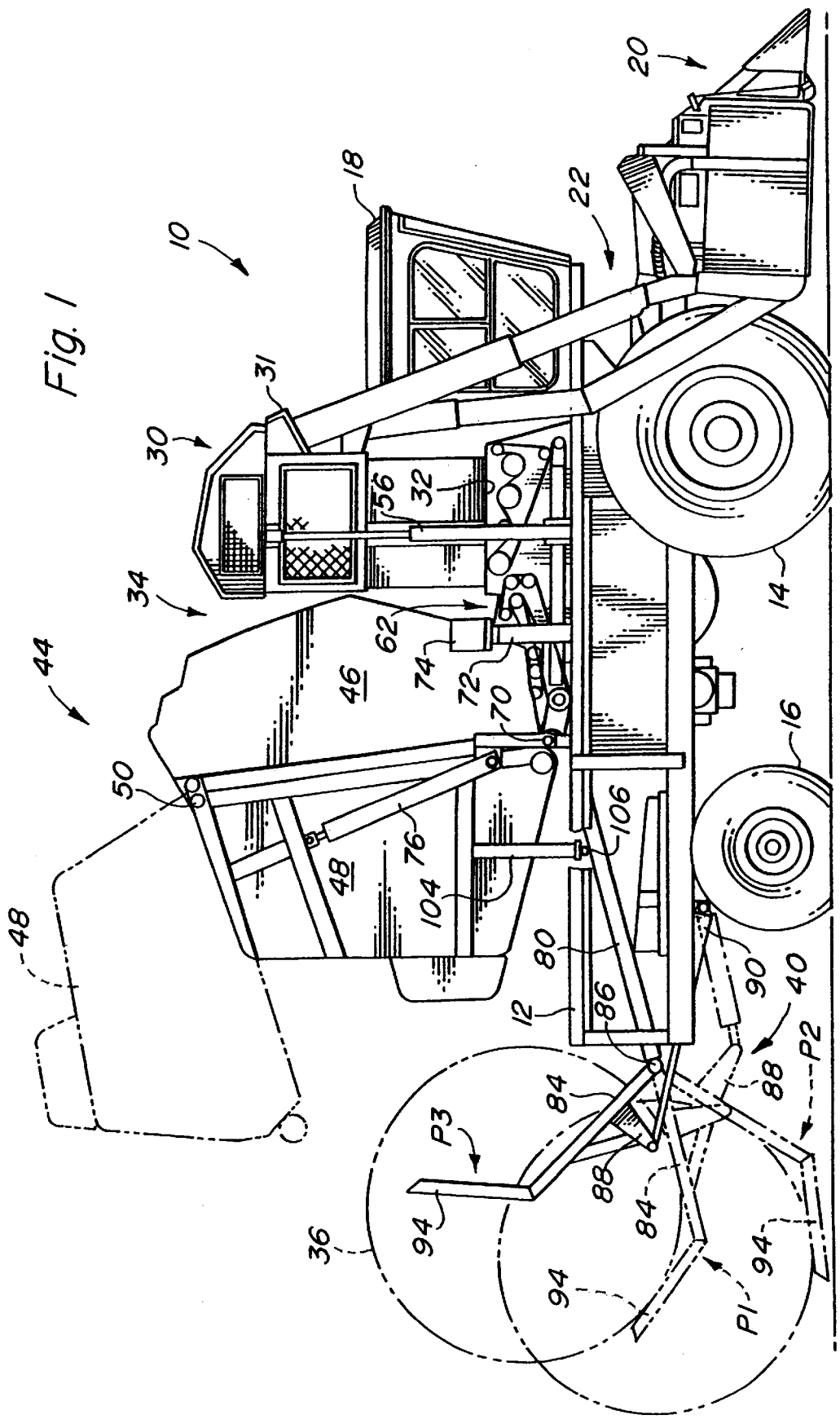
FIG. 1 is a side view of a cotton harvester with a module forming device.

Referring now to FIG. 1 therein is shown a cotton harvester 10 having a main frame 12 supported for movement by forward drive wheels 14 and rear steerable wheels 16. An operator station or cab 18 is supported at the front end of the main frame 12 above forwardly mounted harvesting structure indicated generally at 20 which removes cotton from plants and directs the removed cotton into an air duct system 22.

An upright telescoping accumulator system 30 with an upper inlet structure 31 and a metering floor 32 is supported on the frame 12 behind the cab 18 for receiving the cotton from the air duct system 22. A selectively operable processor or module builder 34, as shown, includes a round baler supported rearwardly of the accumulator system 30. The accumulator system 30 stores cotton as necessary, and the metering floor 32 distributes the cotton to the module builder 34 which, as shown, first forms a compressed mat of material and then rolls the mat into a compact bale or module 36. The accumulator system is shown and described in our copending and commonly assigned U.S. patent application Ser. No. 09/401,253 filed Sep. 23, 1999, entitled Cotton Harvester with Accumulator, and the structure for forming the compressed mat may be of the type shown and described in the aforementioned U.S. Pat. No. 6,032,446 which are incorporated herein by reference.

A module handling system 40 is located rearwardly of the processor 34 for receiving a bale or module from the processor. The handling system 40 temporarily supports the module for transport during field-working operations and then discharges it from the harvester 10 at the desired location in the field.

The module builder 34 is shown as including a round baler generally of a conventional construction having a clamshell type of housing 44 including first and second (front and rear) portions 46 and 48. The portions 46 and 48 are pivotally connected together at an uppermost pivotal location 50. In a field-working position (FIG. 1), the pivotal location 50 and part of the front portion 46 are located at or above the level of the upper portion of the accumulator system 30 and establishes a maximum working height of the harvester 10. The upper portion of the accumulator 30 has a working height approaching that of the housing 44. Cylinders 56 on each side of the accumulator structure 30 lower the upper portion (FIGS. 2 and 4) to a level substantially below the working height of the housing 44. The module builder 34 includes a bale-forming chamber with conventional round baler belt and roller structure shown generally at 60 in FIG. 3 which receives material from the accumulator system 30 via delivery and compacting system 62 when the builder 34 is in the upright field-working position shown in FIG. 1. The baler structure 60 rolls the material into a compact round bale. It is to be understood that other types of delivery systems for conveying the material to the baling device may also be utilized with the present invention.

When a complete bale is formed, the rear portion 48 of the clamshell housing 44 is rocked rearwardly and upwardly about the pivotal location 50 to release the bale from the chamber onto the handling system 40 (broken lines of FIG. 1). The accumulator system 30 facilitates continued operation of the harvester 10 while the bale 36 is released from the chamber. The handling system 40 is positioned to receive, support and transport the completed bale while the harvesting continues. When the desired location such as the end of the field is reached, the system 40 is activated to lower the bale 36 and release it from the harvester 10.

Figure 2:
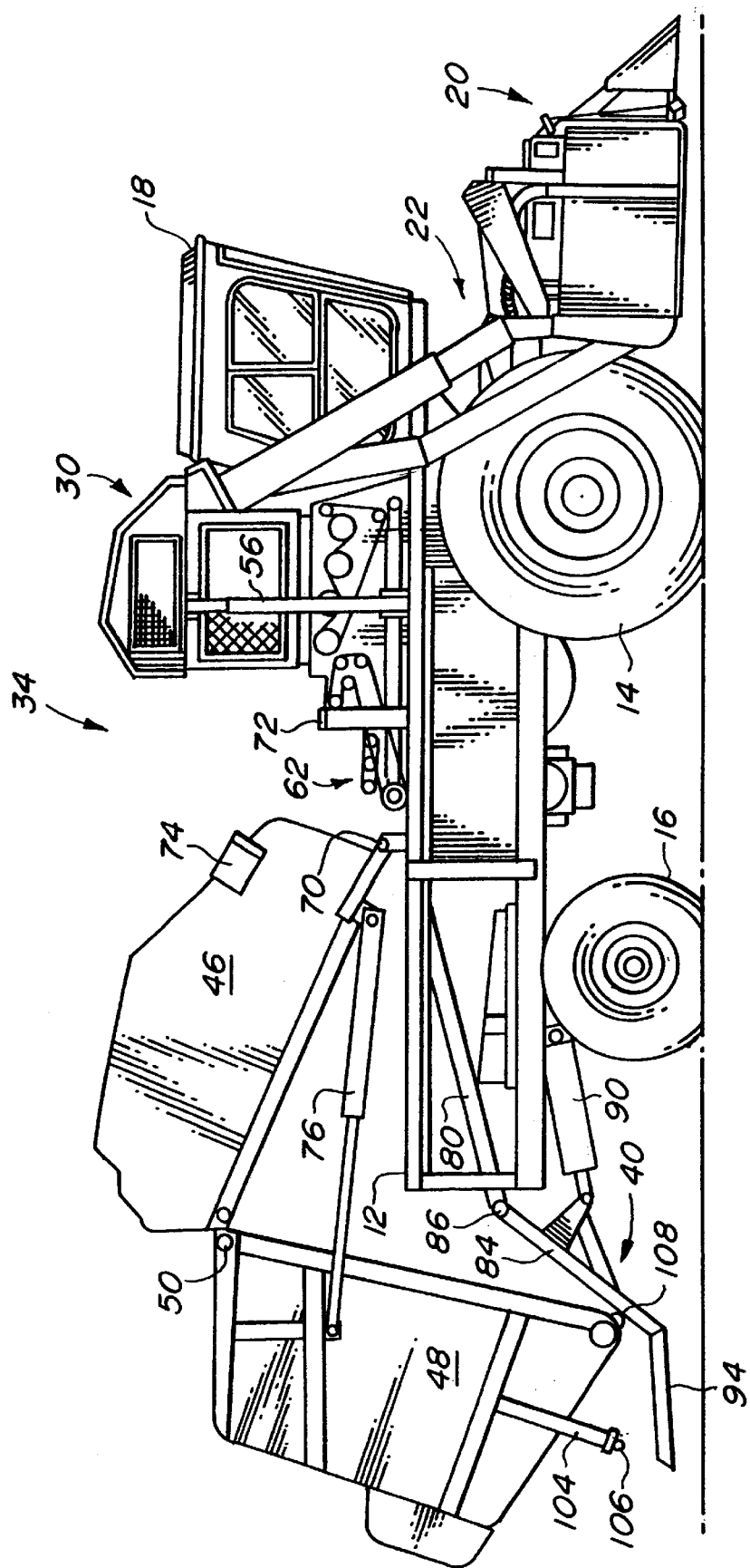
FIG. 2 is a view similar to FIG. 1 but showing the module forming device in the lowered transport position.
Figure 3:
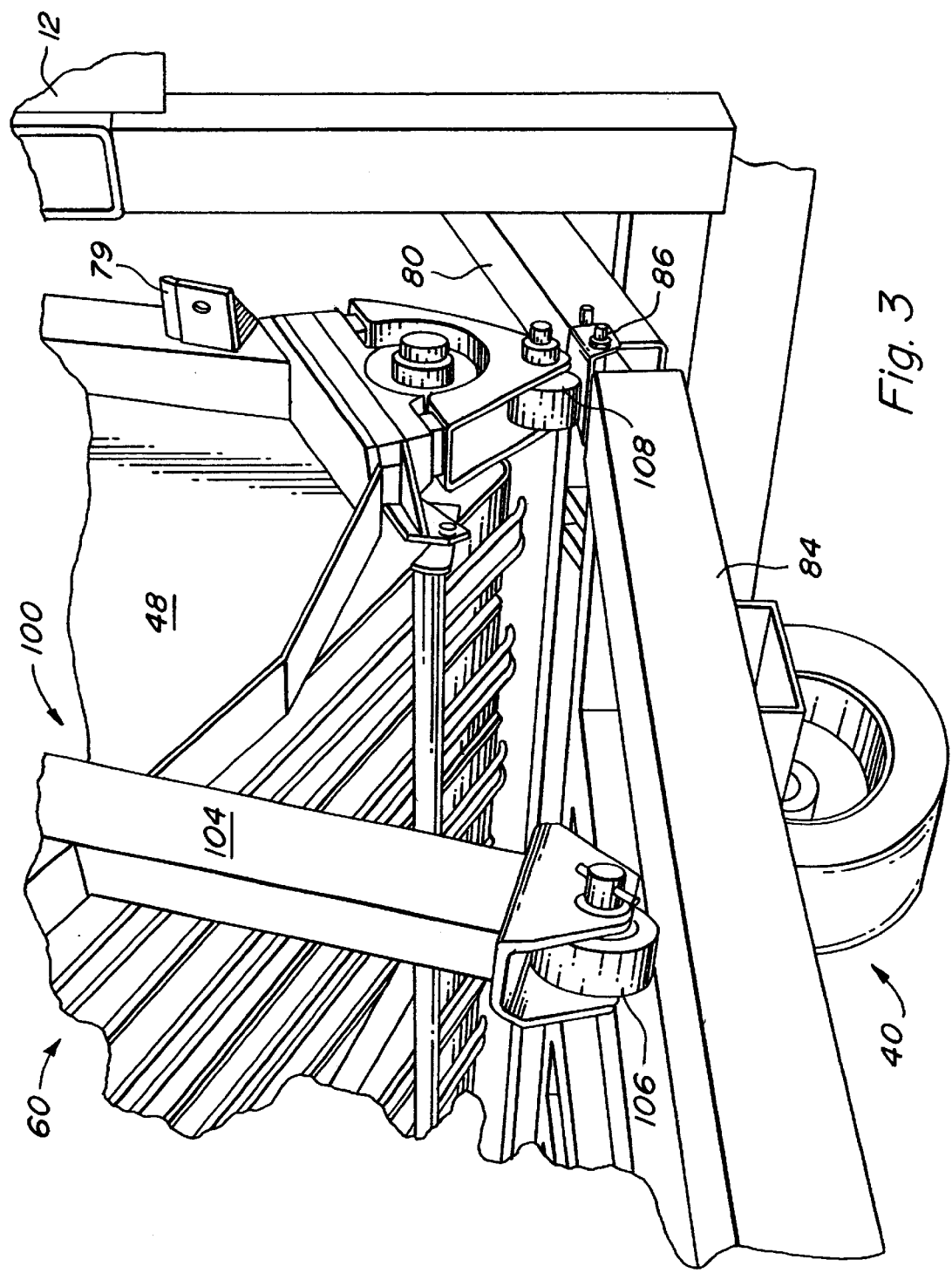
FIG. 3 is an enlarged perspective view of the rear portion of the harvester of FIG. 1 showing details of the ramp and roller structure which assists in guiding the module forming device to the lowered transport position.
Figure 4:
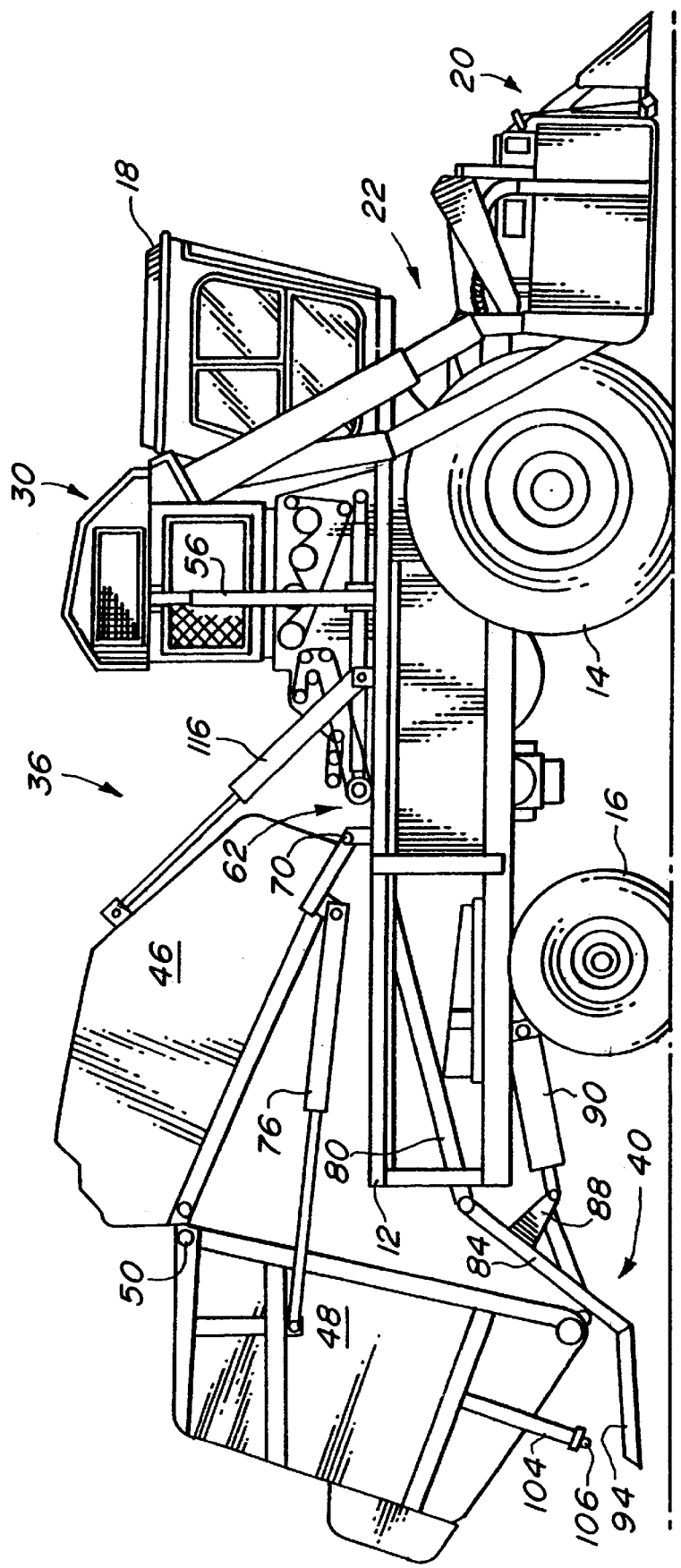
FIG. 4 is a view similar to FIG. 2 but showing an alternate embodiment of the invention wherein additional cylinder structure is provided for moving the forming device between the lowered transport position (shown) and the raised field-working position.

The bottom of the front portion 46 of the clamshell housing 44 is pivotally connected to the frame 12 by a pivot 70 for rocking between an upright field-working position (FIG. 1) and rearwardly and downwardly directed transport position (FIGS. 2 and 4). In the embodiment shown in FIG. 1, an upstanding securing structure 72 is mounted on the frame 12 and contacts a mating member 74 on the front portion 46. A bolt or automatic latch secures the member 74 against the structure 72 to lock the portion 46 in the upright field-working position. Cylinder structure 76 located on each side of the baler includes a first end connected to the section 46 slightly above the pivot 70 and a distal end connected near the upper central region of the section 48. When the cylinder structure 76 is fully retracted (FIG. 1), the sections 46 and 48 abut to define the bale-forming chamber. A conventional section latch, a member of which is shown at 79 in FIG. 3, may be provided to mechanically secure the sections 46 and 48 together. To open the bale-forming chamber, the latch is released and the cylinder structure 76 is extended. The section 48 rocks upwardly and rearwardly about the pivotal location 50 relative to the section 46. When the front portion 46 is latched to the structure 72, extending the cylinder structure 76 causes the housing 44 to open to a bale discharge position (broken lines of FIG. 1) to release the formed bale 36. If, on the other hand, the securing structure 72 is released when the cylinder structure 76 is extended to open the housing (FIG. 2), the section 48 will be supported by and guided downwardly by the handling system 40, as described in further detail below to reduce the transport height of the harvester 10.

The handling system 40 includes a ramp section 80, preferably fabricated from tubing of rectangular cross section extending downwardly from locations rearwardly and below the pivot 70 and terminating just behind the frame 12. The ramp section 80 is designed to receive and support the bale 36 for rolling movement towards the rear of the harvester 10 when the section 48 is pivoted rearwardly and upwardly (broken lines of FIG. 1). A bale support section 84 is connected by a pivot 86 to the rear of the ramp section 80. A downwardly projecting arm 88 connected to the bottom of the bale support section has a lowermost end pivotally connected to the rod end of a cylinder 90. The base end of the cylinder 90 is pivotally connected to a lower portion of the frame 12 below the ramp 80. The bale support section 84 includes an upturned end section 94. With the cylinder 90 in an intermediate extended position corresponding to a bale transport position (P1 of FIG. 1) the support section 84 provides a natural extension of the ramp section 80 so that the bale 36 can roll rearwardly upon release from the chamber out of the pivotal path of the section 48 to allow the clamshell housing 44 to be closed again for harvesting after release of the bale. The end section 94 provides a stop to hold the bale 36 in position at the rear of the harvester 10 while harvesting and baling operation continues. When the desired unloading position in the field is reached, the operator fully retracts the cylinder 90 to pivot the bale support section 84 to a bale release position (P2 of FIG. 1) wherein the end section 94 is angled downwardly in the rearward direction so the bale 36 can roll off the harvester 10. The operator may also fully extend the cylinder 90 to pivot the support section 84 to a storage position (P3 of FIG. 1) during times when the section is not receiving, supporting or discharging a finished bale.

The rear section 48 of the clamshell housing 44 includes follower structure 100 which helps support and guide the housing from the ramp section 80 and the support section 84 as the housing is lowered to the transport position. Support post structure 104 is located on opposite sides of the housing 44, each structure 104 extending downwardly to a lower end terminating in a roller or ramp follower 106. The lower, forwardmost portion of the section 48 also includes a roller or ramp follower 108 (FIG. 3) generally aligned in the fore-and-aft direction with the corresponding roller 106. The rollers 106 and 108 are adapted for support on the top surfaces of the ramp section 80 and the support section 84.

To move the housing 44 to the transport position of FIG. 2, the securing structure 72 is first released to facilitate rotation of the section downwardly and rearwardly (counterclockwise) about the pivot 70. The cylinder structure 76 is then extended to pivot the rear section 48 about the pivot 50 in the clockwise direction relative to the section 46. The rollers 106 which are supported on the ramp section 80 move down the section 80 and onto the support section 84 (FIG. 3) as the clamshell housing 44 opens. The rollers 108 also provide support for the sections depending on the angle of the sections 46 and 48 relative to each other and on the position of the support section 84. As the cylinder 90 is retracted to move the section 84 downwardly, the rollers 108 are supported on the section 84. The uppermost portion of the section 46 of the housing 44 moves to a level generally corresponding to the height of the accumulator 30 (FIG. 2) in the telescoped or retracted transport position. The support section 84 can be positioned to provide the low transport height while still retaining sufficient ground clearance to avoid bottoming out of the handling system 40 during transport. Retracting the cylinder structure 76 closes the clamshell housing 44 and simultaneously moves the housing back to the upright harvesting position of FIG. 1 so the front portion 46 can be latched to the structure 72 and maintained in the upright position for the bale forming and bale release functions. Moving the housing 44 between the transport and working positions can be done relatively quickly and easily.

In alternate embodiment of FIG. 4, separate cylinders 116 are connected between the frame and the front section 46. The cylinders 116 to positively rock the front section 46 rearwardly and downwardly about the pivot 70 as the housing 44 is opened by the cylinder structure 76 to move the housing to the lowered transport position. Retracting the cylinders 116 moves the housing 44 back to the upright working position for bale forming and bale release.

Having described the preferred embodiment, it will become apparent that various modifications can be made without departing from the scope of the invention as defined in the accompanying claims.

We claim:

1. A cotton harvester having a main frame and a baler with first and second portions supported on the main frame, the portions connected at an uppermost extremity generally defining a cotton harvester height and movable relative to each other between a harvesting position for receiving and forming a harvested cotton crop into a compact bale and a discharge position for discharging the bale, and height reduction structure including motor structure connected to the baler and operable to move the first and second portions and thereby move the uppermost extremity between a raised operational position for baling harvested cotton and a lowered transport position, wherein in the lowered transport position the cotton harvester height is substantially less than when the first and second portions are in the raised position.

2. The cotton harvester as set forth in claim 1 wherein the height reduction structure includes a ramp guiding at least one of the portions downwardly as the portions are moved from the harvesting position.

3. The cotton harvester as set forth in claim 1 wherein the first portion is pivotally connected to the frame and further including a member releasably securing the first portion in the harvest position releasable during operation of the height reduction structure to facilitate downward movement of the first portion.

4. The cotton harvester as set forth in claim 1 including an unloading member located adjacent the baler and receiving a bale, and wherein the height reduction structure includes a follower member guided by the unloading member.

5. The cotton harvester as set forth in claim 4 wherein the follower member includes a roller connected to the baler.

6. The cotton harvester as set forth in claim 4 wherein the unloading member is movable between raised and lowered positions, and the unloading member is in the lowered position when the uppermost extremity is in the lowered transport position.

7. A cotton harvester having a main frame and a baler with first and second portions supported on the main frame, the portions having an uppermost extremity generally defining a cotton harvester height and movable relative to each other between a harvesting position for receiving and forming a harvested cotton crop into a compact bale and a discharge position for discharging the bale, and height reduction structure including motor structure connected to the baler and operable to move the uppermost extremity between a raised operational position and a lowered transport position including a cylinder connected between the frame and the second portion and moving the second portion relative to the first portion between the harvesting and discharge positions, and further comprising securing structure maintaining the first portion in an upright position during discharging of the bale and releasable to permit the first portion to move downwardly from the upright position.

8. The cotton harvester as set forth in claim 7 wherein the securing structure comprises a lock securing the first portion relative to the main frame, the lock being releasable to permit the first portion to move from the harvesting position.

9. The cotton harvester as set forth in claim 7 wherein the securing structure comprises a hydraulic cylinder connected between the frame and the first portion.

10. The cotton harvester as set forth in claim 9 wherein the first and second portions are hinged at the uppermost extremity, and the first portion is pivotally connected to the frame.

11. A cotton harvester having a main frame supporting harvesting structure for removing cotton from plants, a module builder supported by the main frame and forming the removed cotton into compact modules, and height reducing structure connected to the module builder and moving the module builder relative to the frame between a raised harvesting position and a lowered transport position, wherein the module builder includes an uppermost extremity generally defining cotton harvester height when the cotton harvester is removing cotton from the plants, the uppermost extremity moving downwardly as the module builder is moved to the lowered transport position.

12. The cotton harvester as set forth in claim 11 wherein the module builder includes first and second portions pivotally connected for movement relative to each other between open and closed positions, and the portions are moved to the open position when the module builder is lowered to the transport position.

13. The cotton harvester as set forth in claim 12 wherein the first portion is pivotally connected to the frame, and locking structure securing the first portion relative to the frame when the module builder is in the raised harvesting position, the locking structure releasable to facilitate movement of the first portion downwardly as the module builder is lowered to the transport position.

14. The cotton harvester as set forth in claim 12 further including ramp structure supporting the portions as the module builder is lowered to the transport position.

15. The cotton harvester as set forth in claim 14 wherein the ramp structure comprises module handling structure which is also operable to support a module.

16. A cotton harvester having a main frame supporting harvesting structure for removing cotton from plants, a module builder supported by the main frame and forming the removed cotton into compact modules, and height reducing structure connected to the module builder and moving the module builder relative to the frame between a raised harvesting position and a lowered transport position, and further including module handling structure connected to the frame and receiving the formed modules, and wherein the module builder is supported on the module handling structure in the lowered transport position.

17. A harvester for removing crop from a field and including an integral module forming device for forming the removed crop into a compact bale, the module forming device including first and second pivotally connected sections, a discharge cylinder connected to the second section and operable to pivot the second section relative to the first section between a closed bale forming position and an open bale discharge position, and positioning structure maintaining the first section in an upright position when the sections are in the bale forming position and facilitating movement of the module forming device to a lowered transport position when the discharge cylinder is operated to pivot the second section to reduce transport height of the harvester.

18. The harvester as set forth in claim 17 further comprising a bale handling system, and wherein at least one of the first and second sections is supported by the bale handling system when the transport height is reduced.

19. The harvester as set forth in claim 17 wherein the positioning structure includes securing structure maintaining the first section in an upright position for bale discharge, the securing structure releasable to permit the first section to move downwardly when the module forming device is lowered to the transport position, and wherein the sections are moved toward the open position as the transport height of the harvester is reduced.

20. The harvester as set forth in claim 17 wherein the positioning structure includes a second cylinder connected to the first section and operable to move the first section downwardly from the upright position, and wherein the discharge cylinder is operated such that the module forming device is opened when the first section is moved downwardly from the upright position.

21. A cotton harvester having a frame supported for forward movement over the ground and including harvesting structure for removing cotton from plants, a baler connected to the frame for forming removed cotton into compact bales, a bale handler supported on the frame adjacent the baler and receiving formed bales from the baler, and wherein the baler includes first and second sections movable relative to each other between a closed bale forming position defining an uppermost harvester extremity and an open position, and positioning structure maintaining the first section in a raised position when the sections are in the bale forming position, the positioning structure facilitating movement of the baler to a lowered transport position wherein the sections are in the open position, and the sections moving downwardly as the baler is moved towards the lowered transport position to thereby lower the uppermost harvester extremity and lower transport height of the harvester.

22. The cotton harvester as set forth in claim 21 wherein the positioning structure includes a structure supported on the bale handler and moving the baler downwardly as the sections are moved to the open position.

23. The cotton harvester as set forth in claim 22 wherein the first section is pivotally connected to the frame and the positioning structure includes a hydraulic cylinder connected between the frame and the first section.

24. A cotton harvester comprising:
a fore-and-aft extending frame;
harvesting structure supported from the forward end of the frame for removing cotton from plants;
baling structure supported by the frame rearwardly of the harvesting structure and forming the removed cotton into compact bales;
bale handling structure connected to the frame adjacent the baling structure and including a movable bale support and a cylinder connected to the bale support for moving the bale support between bale receiving and bale discharge positions;
the baling structure having a closed harvest position and an open release position, wherein in the open release position with the bale support in the bale receiving position, a first bale is released from the baling structure onto the bale support for transport by the harvester;
wherein the first bale is discharged from the harvester when the cylinder moves the bale support to the discharge position; and
wherein the baling structure has an upright harvest position defining an uppermost extremity of the harvester during field-working operations, and cylinder structure connected to the baling structure for moving the baling structure and the uppermost extremity downwardly to a transport position and thereby reducing harvester height.

25. The harvester as set forth in claim 24 wherein the baling structure is pivotally connected relative to the frame for movement between harvest and discharge positions and discharges a bale downwardly onto the bale support when moved to the discharge position.

26. The harvester as set forth in claim 24 wherein the baling structure is supported from the bale support in the transport position.

27. The harvester as set forth in claim 24 wherein the harvester includes an accumulator receiving removed cotton and distributing the removed cotton to the baling structure, the accumulator having an uppermost portion defining a working height and wherein the uppermost portion is movable downwardly for transport.

28. The harvester as set forth in claim 24 wherein the baling structure has an uppermost portion establishing a field-working height of the harvester, and the baling structure is pivotally connected to the frame and rockable downwardly about a pivotal axis to a transport position for establishing a transport height of the harvester which is less than the field-working height.

29. The harvester as set forth in claim 28 wherein the baling structure comprises a two-section clamshell chamber, the clamshell opening as the baling structure is pivoted downwardly toward the transport position to facilitate downward movement of the uppermost portion.

\* \* \* \* \*